(12) United States Patent
Hustad et al.

(10) Patent No.: US 8,043,588 B2
(45) Date of Patent: Oct. 25, 2011

(54) METHOD AND PLANT FOR REMOVING CARBON DIOXIDE FROM FLUE GAS

(75) Inventors: Carl W. Hustad, Skollenborg (NO); Ingo Tronstad, Asker (NO)

(73) Assignees: CO2-Norway AS, Kongsberg (NO); Nebb Engineering AS, Asker (NO)

( * ) Notice: Subject to any disclaimer, the term of this patent is extended or adjusted under 35 U.S.C. 154(b) by 168 days.

(21) Appl. No.: 12/087,580

(22) PCT Filed: Jan. 12, 2007

(86) PCT No.: PCT/NO2007/000015
§ 371 (c)(1),
(2), (4) Date: Nov. 14, 2008

(87) PCT Pub. No.: WO2007/094675
PCT Pub. Date: Aug. 23, 2007

(65) Prior Publication Data
US 2009/0317315 A1 Dec. 24, 2009

(30) Foreign Application Priority Data
Jan. 13, 2006 (NO) .................................. 20060212

(51) Int. Cl.
*B01D 53/62* (2006.01)
*B01D 53/14* (2006.01)
*B01D 53/34* (2006.01)

(52) U.S. Cl. ........ 423/229; 423/210; 423/220; 423/226; 423/228; 95/149; 95/178; 95/179; 95/183; 95/186; 95/187; 95/230; 95/236; 95/241; 95/251; 95/254; 95/258; 95/288; 95/289

(58) Field of Classification Search .................. 423/210, 423/220, 226, 228, 229; 95/149, 179, 183, 95/186, 187, 230, 236, 241, 251, 254, 258, 95/288, 289
See application file for complete search history.

(56) References Cited

U.S. PATENT DOCUMENTS 3,897,227 A * 7/1975 Giammarco et al. ........... 95/169
4,434,613 A 3/1984 Stahl
(Continued)

FOREIGN PATENT DOCUMENTS

EP 0 551 876 A2 7/1993
(Continued)

OTHER PUBLICATIONS

Northwest Power Planning Council, "Natural Gas Combined-cycle Gas Turbine Power Plants." Aug. 8, 2002. Viewed Oct. 4, 2010 at http://www.westgov.org/wieb/electric/Transmission%20Protocol/SSG-WI/pnw_5pp_02.pdf.*

*Primary Examiner* — Stuart Hendrickson
*Assistant Examiner* — Daniel Berns
(74) *Attorney, Agent, or Firm* — Birch, Stewart, Kolasch & Birch, LLP

(57) ABSTRACT

This invention relates to a method and plant for energy-efficient removal of $CO_2$ from a gas phase by means of absorption. The invention is particularly suitable for use in connection with thermal power plants fired by fossil fuels, and is also well-suited for retrofitting in existing thermal power plants. A processing plant according to the invention comprises three sections: a primary $CO_2$-generating process that serves as main product supplier; a $CO_2$-capture and separation plant based on absorption and desorption of $CO_2$ respectively by/from at least one absorbent; and a second $CO_2$-generating process where combustion of carbonaceous fuel in pure oxygen atmosphere serves as energy supply to at least a part of the thermal energy necessary to drive the regeneration of the absorbent in the desorption column(s).

6 Claims, 2 Drawing Sheets

U.S. PATENT DOCUMENTS

Figure 1:
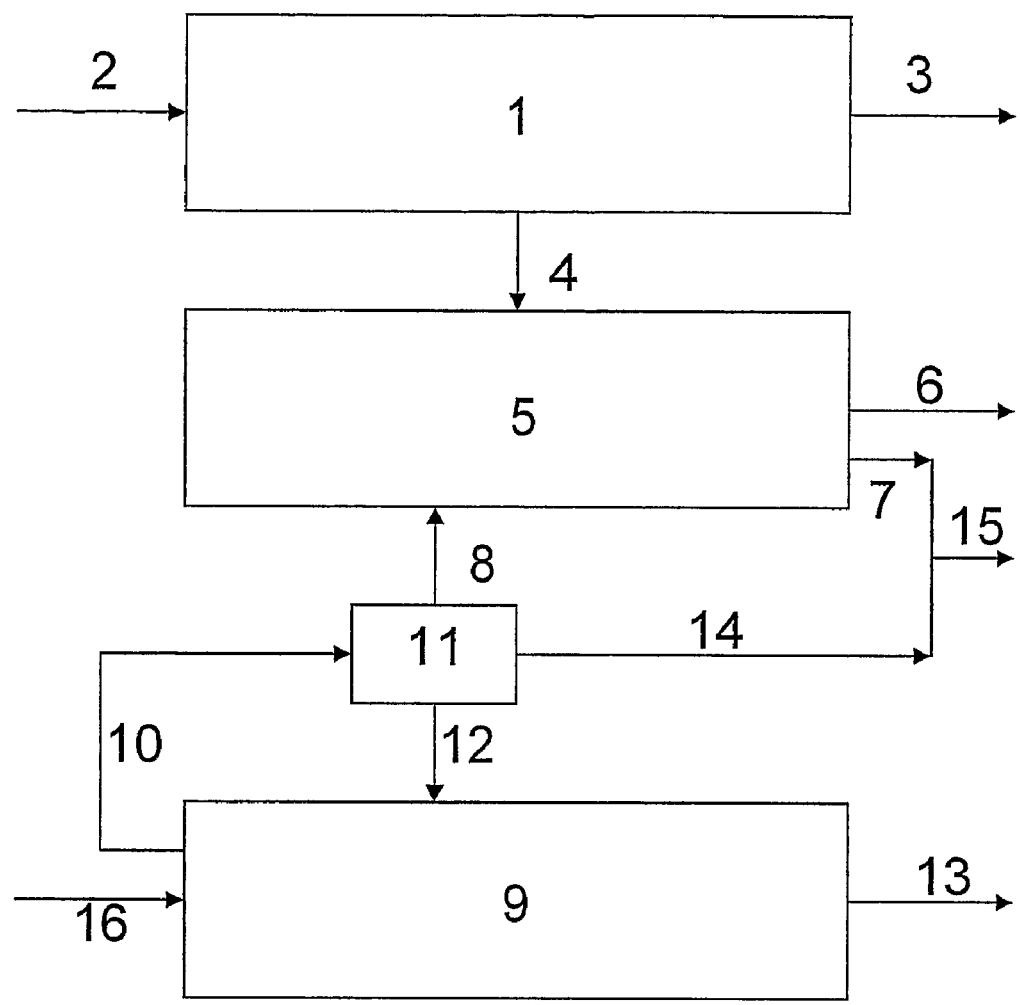

| | | | |
|---|---|---|---|
| 5,190,018 A * | 3/1993 | Costello et al. | 123/573 |
| 5,956,937 A | 9/1999 | Beichel | |
| 6,389,814 B2 | 5/2002 | Viteri et al. | |
| 6,598,398 B2 | 7/2003 | Viteri et al. | |
| 2002/0088235 A1* | 7/2002 | Miyoshi et al. | 60/780 |
| 2005/0166569 A1* | 8/2005 | Christensen et al. | 60/39.1 |
| 2005/1666569 | 8/2005 | Christensen et al. | |

FOREIGN PATENT DOCUMENTS

| | | | |
|---|---|---|---|
| JP | 2001-021139 | * | 1/2001 |
| WO | WO-00/48709 A1 | | 8/2000 |
| WO | WO-2006/043820 A1 | | 4/2006 |

* cited by examiner

METHOD AND PLANT FOR REMOVING CARBON DIOXIDE FROM FLUE GAS

This invention relates to a method and plant for energy-efficient removal of $CO_2$ from a gas phase by means of absorption. The invention is particularly suitable for use in connection with thermal power plants fired by fossil fuels, and is also well-suited for retrofitting in existing thermal power plants.

THE BACKGROUND TO THE INVENTION

For almost 100 years fossil fuels have been man's most important energy source. At the present time fossil fuels cover approximately ⅘ of the world's energy consumption, and there is hardly any sector of society in the industrialised countries today that is not dependent on fossil fuels as energy carrier including the energy sector where the electricity supply in many countries is largely based on thermal power plants fuelled by coal, oil or natural gas.

Fossil fuels are remains of ancient biological material which has been converted to pure carbon structures and/or hydrocarbons in certain types of geological formations. Due to the fact that it is recovered from geological deposits, carbon from fossil sources is added to the present day global organic carbon cycle, disturbing its state of equilibrium. When fossil fuels are combusted, $CO_2$ is created, and water vapour if it is a hydrocarbon. At present, man's use of fossil fuels results in the release of approximately 25 billion tons of $CO_2$ into the atmosphere every year. The result is that $CO_2$ accumulates in the atmosphere and in the sea, in addition to which a great deal of $CO_2$ is bound up as biomass. About half of the carbon from fossil sources is accumulated in the atmosphere, with the result that from 1850 until today the atmosphere's $CO_2$ content has increased from about 280 to about 370 ppm.

$CO_2$ is one of several greenhouse gases in the atmosphere, i.e. gases which have the capacity to absorb the heat radiation from the earth's surface, thereby checking the heat loss from the earth out into space. This is a welcome effect since the total greenhouse effect today raises the temperature of the earth atmosphere in the troposphere by about 30° C., resulting in a comfortable global mean temperature of around 15° C. In recent times, however, increasing concern has been expressed that if the greenhouse gas continues to increase in the atmosphere at the same rate as today for the next decades, it could severely disturb the earth's heat balance with potentially dangerous consequences as a result of extensive glacier melting, altered precipitation patterns, increased incidents of extreme weather, etc. This concern is based on work carried out and discoveries from climate research in recent years, and has resulted in many scientific communities beginning to issue warnings that it may be dangerous for coming generations if we who are alive today continue to steadily release greenhouse gases into the atmosphere. This message is now in the process of finding a footing in political opinion in many countries, and increased requirements for reduction in emissions of greenhouse gases are expected in the near future.

After almost 100 years of development of infrastructure based on fossil fuels as energy carrier, it is impossible in practice and economically impossible to scrap this infrastructure in the near future. For example, large deposits of fossil fuels such as oil, natural gas and not least coal still exist, representing enormous values. A realistic expectation with regard to early reductions in emissions should therefore be based on a combination of purposeful implementation of new technology which in the long term will replace today's infrastructure and development of purification systems in existing infrastructure based on utilisation of fossil fuels as energy source.

PRIOR ART

It is known that $CO_2$ can be pressurised and deposited in salt slate or in some other porous rocks including oil-bearing rocks. Another alternative is to dissolve the gas in the depths of the ocean. This has been introduced as a practical and economically viable solution for thermal power plants and other industrial processes that emit large volumes of exhaust gas containing $CO_2$.

It is known that $CO_2$ can be separated from a gas by passing the gas through a column where the gas flows counter-current to an absorbent in liquid phase. A mature and well-known technology based on this principle is separation of $CO_2$ from flue gas by means of one or more amines in water as absorbent. This purification technology has been shown to be suitable in a number of industrial processes where there is a need to separate $CO_2$ from a gas. Examples of uses of amine absorbent for removing $CO_2$ are purification of flue gases from thermal power plants, removal of $CO_2$ from the process flow during production of ammonia, removal of $CO_2$ from natural gas, etc.

An amine plant for separation of $CO_2$ consists of at least one absorption column where amine dissolved in water runs counter-current relative to the gas that is to be purified. This column is usually referred to as a scrubber or absorber, and the column will normally be vertically oriented and the flue gas is introduced into the lower part of the column and fresh absorbent solution is introduced from the top of the column. At moderate to low temperatures $CO_2$ in the flue gas will be absorbed by the amine in a weak chemical bond, with the result that the amine is enriched with $CO_2$ as it travels down the column and $CO_2$ is correspondingly removed from the flue gas as it travels up the column. When the flue gas reaches the top of the column, its purification is complete and it is then vented to the atmosphere. The enriched amine is discharged from the lower part of the absorption column and introduced into the upper part of at least one vertically located desorption column, also called a stripper. There the enriched amine will be passed down through the desorption column while being heated. At higher temperatures the amine will release the absorbed $CO_2$ with the result that the amine flow is stripped of $CO_2$ as it travels through the desorption column and a gas of released $CO_2$ will ascend the column. In this way the amine is regenerated and can be discharged from the lower part of the desorption column and reintroduced into the upper part of the absorption column. The released $CO_2$ gas is collected from the upper part of the desorption column and sent for further processing.

As already mentioned, the great advantage of the amine process is the fact that it is a mature and documented well-functioning technology which can be used for so-called "post process" purification of all major $CO_2$ emission sources, both power plants and industrial processes. An amine plant can be retrofitted in existing industrial plants without extensive alterations to the existing processing plant, and the operation of the purification plant can be made independent of the operation of the production plant. This is a distinct advantage as the operational stability of the production plant is not affected by any technical inspection or irregular stoppage of the purification plant. Another advantage is that amine plants have documented approximately the same efficiency as known alternative methods of separating $CO_2$ from a gas flow. Present day amine-based absorption plants remove 85-90% of the exhaust's $CO_2$ content.

The major drawback with an amine plant is that it requires energy. Electric current is needed to drive the pumps required for driving the gas and amine flow and cooling water through the plant. The greatest energy requirement, however, is undoubtedly associated with the need to heat up the amine flow in the desorption column. For amine-based absorption plants the absorption will typically take place at a temperature in the range 40-50° C. while the desorption requires a temperature in the range 120-130° C. Even though a great deal of the heat requirement can be obtained by heat exchanging hot regenerated amine from the desorption column (on the way into the absorption column) with cold enriched amine from the absorption column (on the way into the desorption column), an external heat source is necessary, normally in the form of steam at 120-140° C. which heats up the amine in the lower part of the desorption column.

The total energy consumption in the amine plant will typically lower the efficiency of a thermal power plant by 7-11 percentage points, and may represent an increase of up to 50% in the power price. There is therefore a substantial economic potential associated with finding methods of reducing the effect of the energy use in amine plants for removal of $CO_2$ in flue gas.

In cases where the $CO_2$-generating processing plant comprises a steam system, in principle it is possible to integrate the steam system with the $CO_2$ capture and separation process in order to deliver the hot steam required by the desorption process. This will considerably reduce the energy loss of the combined $CO_2$-generating process and the $CO_2$ capture and separation process. On account of the relatively high steam temperature that is necessary in order to strip the absorbent, however, the heat recovery steam generator in most conventional $CO_2$-generating processing plants will have to be altered to enable steam to be supplied at such high temperatures. This makes it difficult to retrofit $CO_2$-handling equipment in existing $CO_2$-generating plants without switching off the whole plant during reconstruction of the heat recovery steam generator. Another disadvantage is that the primary process of the plant, the $CO_2$-generating process, will be less efficient since energy in the form of hot steam is extracted for use in the desorption column (but the complete process including this will be more efficient). In addition to this, an integrated primary $CO_2$-generating process and $CO_2$-capture process means that both processes have to be run as a single process, resulting in less flexibility and lower on-line factor for the complete complex compared with the $CO_2$-generating process alone. This consequence is generally considered to be so unfavourable as to make it preferable to reduce the total energy efficiency and instead obtain the hot steam required for running the desorption column from an external steam source.

The penalty in the form of energy loss for running the primary $CO_2$-generating process and $CO_2$-handling process as two separate processes is substantial. For example, for thermal power plants fuelled by natural gas, the total electrical energy output will be lowered from approximately 58% without $CO_2$ capture to around 48-50% with the use of amine stripping. Thus there is a substantial energy loss associated with handling of greenhouse emissions from combustion gases and a corresponding need for more efficient methods of performing stripping of the combustion gases.

Clean Energy Systems Inc. has suggested building power plants based on combustion of a pure carbonaceous fuel in the presence of pure oxygen and water, resulting in the production of a high-energy gas at high temperature and pressure consisting of only water and $CO_2$ in a type of gas generator called an oxy-fuel generator. The thermal and mechanical energy in this gas can be utilised to produce, for example, electrical energy in conventional steam-driven multistage turbines. After the useful energy in the gas from the oxy-fuel generator is converted to electrical energy, the relatively cold gas mixture of steam and $CO_2$ can easily be separated by cooling until the steam is condensed into liquid water. The resulting gas phase consists of pure $CO_2$ which is ready for pressurisation and depositing. This technology is described in detail in and protected by a number of patents. See, for example, U.S. Pat. Nos. 6,389,814, 6,598,398 and 5,956,937.

On account of large known natural gas reserves, a great many gas power plants are currently being built and used, and many more will be built in the near future. From the point of view of the climate, therefore, it is important to handle the emissions of greenhouse gases by equipping these, both the existing and the projected gas power plants with $CO_2$ capture and separation.

THE OBJECT OF THE INVENTION

The main object of this invention is to provide a method and a plant for reducing the energy costs associated with capture and separation of $CO_2$ from a gas phase by the use of conventional gas absorption technology.

Another object is to provide a method and a plant for capture and separation of $CO_2$ from a gas phase which can easily be retrofitted to existing $CO_2$-generating processes or plants.

Another object is to reduce the need for external heat for heating the desorption column of amine-based purification plants.

Another aim is to provide a method and a plant for increasing the efficiency of production of electrical energy in thermal power plants with amine-based purification of the flue gas.

Yet another aim is to provide a method and plant that can capture and separate $CO_2$ from a gas phase with increased efficiency relative to produced energy.

GENERAL DESCRIPTION OF THE INVENTION

The object of the invention can be achieved by the features which will be apparent in the following description of the invention and/or from the patent claims.

This invention is based on the acknowledgement that at least a part of the thermal energy that is necessary for regenerating the absorbent in the desorption column(s) of conventional absorbent-based $CO_2$-capture and separation plants can be provided by combustion of one or more carbonaceous fuels in pure oxygen atmosphere. This can give an exhaust gas substantially consisting of steam and $CO_2$ at high temperature and pressure, provided the fuel is a hydrocarbon, that the oxygen is added in stoichiometric ratios and that the combustion is complete. This exhaust gas can be separated into a pure water and a pure gaseous $CO_2$ fraction by condensation of the steam. This type of combustion plant therefore has an advantage whereby virtually 100% capture and separation of the $CO_2$ formed are easily achieved by removing the energy in the exhaust until condensation occurs. In other words, the combustion products are separated by utilising the combustion heat. It is possible, and in many cases desirable to conduct this combustion with controlled injection of water in order to control pressure and temperature of the exhaust to match downstream processing equipment.

A processing plant according to the invention will therefore comprise three sections:
- a primary $CO_2$-generating process that serves as main product supplier,
- a $CO_2$-capture and separation plant based on absorption and desorption of $CO_2$ respectively by/from at least one absorbent, and
- a second $CO_2$-generating process where combustion of carbonaceous fuel in pure oxygen atmosphere serves as energy supply to at least a part of the thermal energy required in order to drive the regeneration of the absorbent in the desorption column(s).

By primary $CO_2$-generating process we mean the plant's main product supplier. This is one or more processes and plants for manufacturing products where the actual manufacture of the products or the energy production for manufacturing the products is associated with formation of exhaust gases or process gases containing $CO_2$. Any process may be employed that forms exhaust gases or process gases from which $CO_2$ can be removed in conventional absorption-based $CO_2$-capture and separation plants as primary $CO_2$-generating process in this invention. Examples of suitable processes are thermal power plants fired by carbonaceous fuels such as coal, oil, gas power plants and biofuel, cement factories, ammonia production plants, etc. Such processes normally employ air as oxidising agent.

By $CO_2$-capture and separation plants based on absorption we mean a plant where the capture part comprises a plant/process where a gas from which $CO_2$ has to be removed makes contact with one or more absorbents which absorb at least a part of the gas's $CO_2$ with the result that a gaseous phase is created comprising purified gas and an absorbent phase comprising one or more $CO_2$-enriched absorbents. The purified gas is captured and sent for after-treatment and/or venting to the atmosphere. The enriched absorbent phase is passed to the separation part comprising a plant/process where the enriched absorbent phase is brought into a desorption condition, i.e. the absorbed $CO_2$ is released from the absorbent(s) with the result that the absorbent(s) are regenerated and a gas phase is created substantially consisting of pure $CO_2$ gas. This substantially pure $CO_2$ gas is collected and sent for depositing/after-treatment. The regenerated absorbent(s) are returned to an absorption condition and sent back to the capture part to undergo a new absorption/desorption cycle. Use may be made of one or more of any absorbent(s) that are capable of absorbing $CO_2$ from a gas phase at the relevant pressure and temperatures. The same applies for absorption and desorption plants/processes, and there are no other technical conditions or design requirements attached to these for use in this invention than that the regeneration of the absorbent(s) is conducted by the supply of thermal energy. Thus the invention can employ any absorption-based capture and separation plant, both those that are known today and any that may be developed in the future. The inventive feature associated with this part of the plant is a combined heat exchanger and condenser where thermal energy in the exhaust gas from the second $CO_2$-generating process is exchanged with the absorbent(s) in the desorption part of the plant/process in such a manner that the steam in the exhaust is almost completely condensed and the residual gas phase, almost pure $CO_2$, is captured and sent for after-treatment. Exhaust gas from the second $CO_2$-generating process will therefore not require to be passed through an absorption-based $CO_2$-capture and separation plant, but its $CO_2$ content can and should be separated and captured by a condensation upstream of the $CO_2$-capture and separation plant.

By second $CO_2$-generating process we mean any combustion process where a carbonaceous fuel is combusted in pure oxygen atmosphere, possibly with injection of water. It is preferred that the fuel is a relatively pure carbon structure or a pure carbohydrate, so that the combustion produces an exhaust consisting of relatively pure steam and/or $CO_2$. However, this should not rule out use of other fuels which result in an exhaust containing other combustion products, and which in turn result in the need to include other purification processes in order to separate these combustion products from the exhaust from the second $CO_2$-generating process.

The principal mode of operation and construction of a method/plant according to the invention is schematically illustrated in FIG. 1. The primary $CO_2$-generating process is indicated as a box with reference numeral 1, and it is fed with carbonaceous raw material/fuel 2 which is converted to a product 3 and an exhaust gas 4 containing $CO_2$, normally using air as oxidising agent. The exhaust gas 4 is passed to the plant for $CO_2$ capture and separation indicated by a box with reference numeral 5, where $CO_2$ in the gas 4 is captured, i.e. absorbed and subsequently separated by desorption into a pure gaseous $CO_2$ fraction 7 which is sent for after-treatment/depositing. The purified exhaust gas 6 is sent for after-treatment/venting to the atmosphere. The thermal energy 8 required to drive the desorption process is provided at least partly by heat exchanging the absorbent in the desorption phase with the exhaust gas 10 from the second $CO_2$-generating process 9 in the combined heat exchanger and condenser 11. In the figure it is indicated that the combined heat exchanger and condenser 11 provides all the thermal energy to run the desorption process, but of course it is possible to adapt the operation of the second $CO_2$-generating process 9 in such a manner that only a part of the thermal energy for the desorption process comes from the heat exchanger 11 if other suitable thermal energy sources are available. It is also clearly possible to scale the second $CO_2$-generating process 9 so that the heat exchanger 11 provides more thermal energy than that required by the desorption process, if other suitable users of this energy exist.

The second $CO_2$-generating process is indicated by a box with reference numeral 9. As already mentioned, this process will create an energy-rich exhaust gas 10 by combusting a carbonaceous fuel 16 in pure oxygen atmosphere, which exhaust can be employed firstly to create a product 13 and subsequently the residual energy in the exhaust gas 10 can be reduced by means of a combination of heat exchanging and condensing in the combined heat exchanger and condenser 11. The residual energy is discharged from the heat exchanger 11 as a thermal energy flux 8 into the desorption process. By correctly setting the pressure and temperature of the exhaust gas 10, almost all the steam will be condensed in the combined heat exchanger and condenser 11, thereby achieving a virtually 100% separation into a liquid water fraction 12 and a gaseous fraction 14 of substantially pure $CO_2$. This gas flow 14 will be mixed with the $CO_2$ flow 7 and sent for after-treatment/depositing 15.

The combination according to the invention provides several advantages. The primary $CO_2$-generating process, or the main product supplier, can be run independently of the remaining processing parts in the plant. The only connection between the primary process product supply part and the remaining two sections is a connection that transfers the exhaust gases 4 from the primary $CO_2$-generating process 1 to the absorption part of the $CO_2$ capture and separation section 5. This permits the primary product delivery part to be run and optimised in a conventional manner like that of existing plants, with the focus on optimised energy efficiency in the primary product delivery process. This makes it relatively easy to retrofit $CO_2$-capture in existing $CO_2$-generating processes. Another advantage is that the implementation of a secondary energy supplier with an energy system for running the regeneration of the absorbent(s) will increase the amount of product supplied by the plant without simultaneously increasing the need for external energy for running the $CO_2$-capture and separation section. The waste heat from the second $CO_2$-generating process can be employed in its entirety to run the regeneration of the absorbent(s) in the desorption phase. The energy efficiency for the total plant is thereby increased, and the penalty for implementing $CO_2$ capture is correspondingly reduced. An additional advantage is that virtually 100% of the $CO_2$ in the exhaust from the second $CO_2$-generating process can be captured and deposited, and this will increase the total capture percentage for the whole plant since in practice a pure absorption-based capture does not capture more than 85-90%.

LIST OF FIGURES

Figure 2:
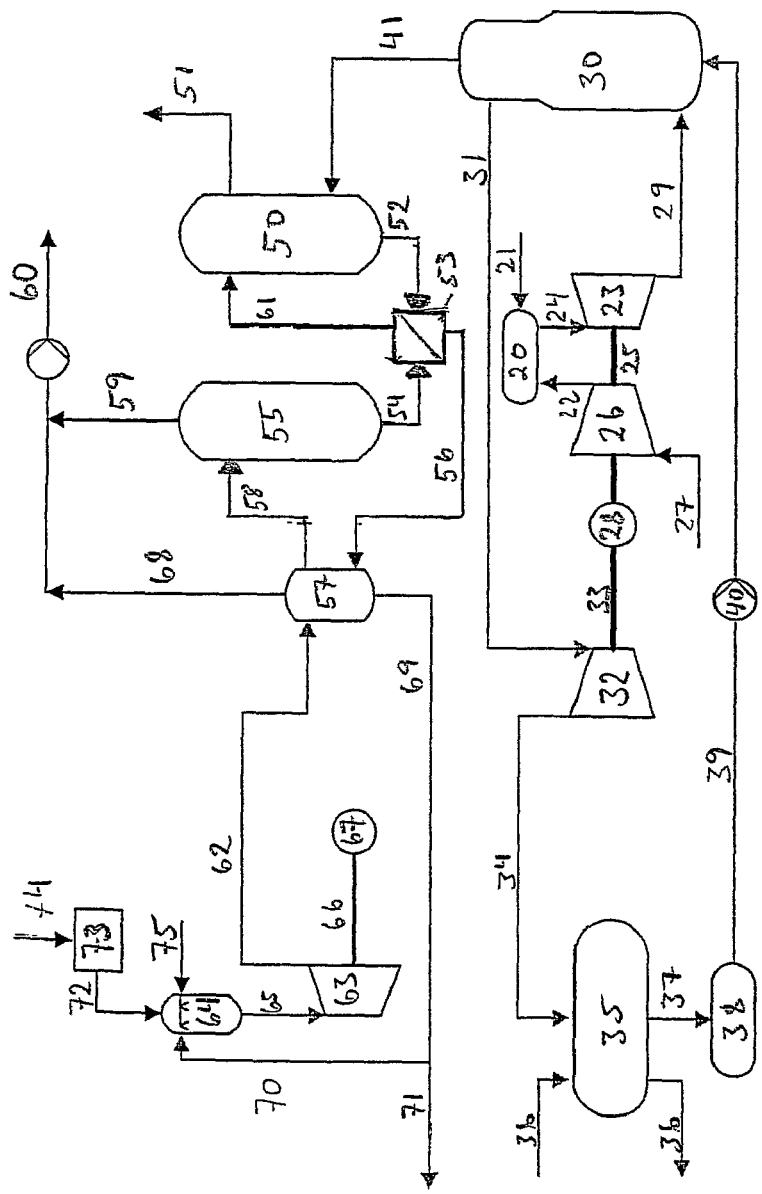

FIG. 1 is a flow diagram illustrating the principle of a plant/method according to the invention FIG. 2 is a flow diagram of a preferred embodiment of the invention.

EXAMPLE OF A PREFERRED EMBODIMENT OF THE INVENTION

The invention will now be described in greater detail in the form of a preferred embodiment illustrated schematically in FIG. 2.

In the preferred embodiment of the invention the primary $CO_2$-generating process is a power plant of the type "natural gas combined cycle" (NGCC). From the technical point of view the invention can function almost equally well with all types of the above-mentioned primary processes, but for marketing reasons the so-called "natural gas combined cycle"—gas power plant is preferred as the primary $CO_2$-generating process in this invention.

For handling $CO_2$ in the flue gas from the NGCC plant, the use is preferred of a conventional amine-based scrubber plant comprising one or more absorption and desorption columns for $CO_2$ capture and separation. This technology has been chosen since it is a relatively cheap, well-proven and functional technology which manages to separate 85 to 90% of $CO_2$ in the flue gas from the NGCC plant.

A preferred second $CO_2$ generating process is the gas generator from Clean Energy Systems Inc., described in the chapter "prior art" above. The gas generator will supply an energy-rich gas consisting of substantially pure $CO_2$ and steam that can be exploited to create mechanical or thermal energy for downstream processing equipment. In the preferred embodiment the exhaust gas will be passed through a steam turbine generator for production of electrical energy. In this case the gas generator will be run so as to deliver an exhaust gas consisting of approximately 90% steam and 10% $CO_2$, typically at 80 bar pressure and 600° C. After passing through the steam turbine generator the gas should have a residual energy, i.e. pressure and temperature suitable for ensuring that, when the residual energy in the exhaust gas is heat exchanged with the absorbent in the combined heat exchanger and condenser for the desorption column(s), all the steam is condensed and the absorbent is raised to a temperature suited for regeneration. In the preferred example with an amine-based scrubber plant, the exhaust that is introduced into the combined heat exchanger and condenser should maintain a temperature in the range 120-140° C. and a pressure in the range 1-6 bar, normally 3-6 bar in order to raise the temperature of the amine to an efficient desorption temperature. The condensed steam can be recycled to the gas generator as feed water, while pure $CO_2$ is blown off from the heat exchanger and mixed with $CO_2$ from the desorption column(s). When using other absorbents, the operation of the gas generator and/or the steam turbine generator should be adapted so that the exhaust gas maintains a suitable pressure and temperature when introduced into the combined heat exchanger and condenser.

The preferred embodiment of the invention is illustrated schematically in FIG. 2. The primary $CO_2$-generating process, which in this case is an NGCC plant, is indicated by reference numerals 20 to 40 in FIG. 2. NGCC power plants are well known to those skilled in the art and require no further explanation. The parts of the plant are: combustion chamber 20 which is fed with natural gas 21 and compressed air 22. The exhaust gas 24 from the combustion chamber 20 enters gas turbine 23 which via shaft 25 drives the compressor 26 which compresses fresh air supplied via intake 27 and a generator 28 for production of electrical power. The exhaust gas 29 from gas generator 23 enters a steam boiler 30, and steam 31 from steam boiler 30 drives a steam turbine 32 which via shaft 33 helps to drive generator 28. The steam 34 from steam turbine 32 enters a condenser 35 which is cooled by cooling water 36. Condensed water 37 from the condenser 35 circulates via water tank 38 and pipeline 39 with pump 40 to the steam boiler 30 in order to go through a new cycle. The only connection between the NGCC power plant and the rest of the system is a pipeline 41 which transfers the flue gas from the steam boiler 30 to the $CO_2$ capture and separation plant. This means that by providing the pipeline 41 with a branch with a shut-off valve to a flue (not shown in the figure), the operation of the NGCC plant can be made completely independent of the operating status of the other sections of the plant by opening the shut-off valve, thereby enabling the flue gas 41 to be vented to the atmosphere if a stoppage occurs in other parts of the plant. In this way the operational stability of the NGCC power plant will be fully in line with corresponding power plants without $CO_2$ capture and separation.

The $CO_2$ capture and separation plant is also well-known to a person skilled in the art and requires no further explanation beyond what is stated in the chapter "prior art" above. The figure shows an absorption column 50 where the flue gas 41 from steam boiler 30 enters the lower part of the column 50, makes contact with the absorbent in the column and is discharged in the upper part as purified flue gas 51. The relatively cold enriched absorbent 52 is removed in the lower part of column 50 and passed to heat exchanger 53 where it is preheated by being heat exchanged with hot regenerated absorbent 54 leaving the desorption column 55. After preheating in the heat exchanger 53, the preheated enriched absorbent 56 is passed to a combined heat exchanger and condenser 57 where the temperature is raised a sufficient amount to form an absorbent 58 at desorption temperature which is introduced into the upper part of the desorption column 55 for regeneration or stripping of the absorbed $CO_2$. The released $CO_2$ 59 is collected in the top of the desorption column 55 and sent for depositing or after-treatment 60. After the hot regenerated absorbent 54 has been cooled by being heat-exchanged with absorbent 52, it enters the upper part of the absorption column 50 as a relatively cold regenerated absorbent 61. This completes the absorbent circuit in the $CO_2$ capture and separation plant.

The thermal energy required to drive the desorption process in the desorption column 55 is supplied in the form of exhaust gas 62 from the steam turbine 63 for the second $CO_2$-generating process. As already mentioned, in this preferred embodiment of the invention a gas generator is utilised which combusts a hydrocarbon or alcohol in pure oxygen atmosphere while water is injected as the second $CO_2$-generating process. This type of combustion process and generator are described in detail in U.S. Pat. Nos. 6,389,814, 6,598,398 and 5,956,937 for Clean Energy Systems Inc., and we refer to these publications for a detailed description of the preferred second $CO_2$-generating process. In FIG. 2 it is indicated by gas generator 64 which creates an energy-rich gas mixture 65 substantially consisting of steam and $CO_2$ which are passed to steam turbine 63, which via shaft 66 drives generator 67 for production of electrical power. After the gas 65 has passed steam turbine 63 it is passed on in the form of exhaust gas 62 to the combined heat exchanger and condenser 57. There the gas mixture is separated into a gas phase 68 consisting of substantially pure $CO_2$ which is sent for depositing/after-treatment 60 and a liquid phase 69 of substantially pure water which is partly recycled 70 to the gas generator 64 and partly discharged from the plant for disposal or other use 71. The oxygen 72 for the gas generator is provided by an air separation unit 73 which separates atmospheric air 74 into a relatively pure oxygen fraction 72 and a residual fraction (not shown). The fuel for the gas generator 64 is introduced via inlet 75.

Process calculations of the preferred embodiment illustrated in FIG. 2 have been carried out when the primary NGCC plant is scaled to deliver 430 MW electrical power when operated optimally according to the state of the art, i.e. it achieves a net energy efficiency of 58%. The NGCC plant is therefore supplied with natural gas 21 with combustion heat corresponding to 740 MW. This plant produces 1 900 000 $Nm^3$ flue gas per hour, corresponding to 145 tons of $CO_2$ per hour. Capture and separation of $CO_2$ from these volumes of flue gas in an amine-based scrubber plant require the supply of 104 MW in the form of heated absorbent 58 into the desorption column(s) 55. The energy for heating the absorbent 58 is provided by a gas generator 64 which is fed with natural gas 75 corresponding to 164 MW combustion heat. In addition to the 104 MW heat emitted to the desorption process, 51 MW of the energy in the natural gas is converted by the second $CO_2$-generating process into electrical power. Internal power consumption in the plant for operation of pumps, compressors, fans, etc. is 5.8 MW. Altogether the plant is supplied with 904 MW energy in the form of natural gas and it delivers 475 MW electrical power. In other words the whole plant has a net energy efficiency of 53% in contrast to the prior art where the net energy efficiency is between 48 and 50%. The benefit of the plant/process according to the invention compared with the prior art is a net production of 45 MW electrical energy (51 MW minus internal consumption of 6 MW) from the second $CO_2$-generating process.

The balance sheet for the $CO_2$ capture efficiency is as follows: the NGCC plant produces 145 tons of $CO_2$ per hour. 130 tons of this are captured and separated per hour in the amine-based scrubber plant. This means that 15 tons per hour, or a little more than 10% of the flue gas's $CO_2$ content avoids the absorption process and is vented to the atmosphere. The second $CO_2$-generating process combusts natural gas corresponding to 32.5 tons of $CO_2$ per hour. This $CO_2$ is separated out and deposited 100%. For the whole plant, therefore, the figures are: total amount of $CO_2$ produced is 177.5 tons per hour. 162.5 tons of this $CO_2$ is captured and deposited per hour, representing a net capture and depositing efficiency of 91.5%.

Even though the preferred embodiment of the invention is in the form of a specific gas power plant as primary and a specific gas generator with combustion in pure oxygen atmosphere as secondary $CO_2$-generating process, this should not be perceived as a limitation of the invention. The inventive combination can function with any type of primary process which delivers an exhaust/process gas containing $CO_2$ levels suitable for separation by means of one or more absorbents in a scrubber plant. No other conditions are attached to the second $CO_2$-generating process than that it should deliver a gas consisting substantially of steam and $CO_2$ at a pressure and temperature that make it suitable for use as an energy source for regeneration of the absorbent(s) in the scrubber plant, either directly or via other consumers of the exhaust gas's energy content such as, e.g. a steam turbine.

The invention claimed is:

1. A method for energy-efficient capture and separation of $CO_2$ from a gas phase, comprising:
    bringing the gases that are to be purified into contact with one or more $CO_2$-absorbents under absorption conditions which are such that at least a proportion of the gas' $CO_2$-content is absorbed, whereupon the purified gas is sent for after-treatment/venting to the atmosphere,
    bringing the at least one $CO_2$-enriched absorbent into desorption conditions by the supply of thermal energy, with the result that at least one absorbent is regenerated by the absorbed $CO_2$ being released from the absorbent(s) and forming a gas phase consisting of substantially pure $CO_2$,
    collecting the substantially pure $CO_2$ gas phase and sending the collected substantially pure $CO_2$ gas phase for depositing and/or downstream after-treatment, and
    receiving the gas that is to be purified from one or more primary $CO_2$-generating processes,
    wherein at least a part of the thermal energy required to bring the at least one enriched absorbent into the desorption conditions is provided by heat exchanging with an exhaust gas from a secondary $CO_2$-generating process where a substantially pure carbonaceous fuel is combusted in a substantially pure oxygen atmosphere, thereby forming an energy-rich exhaust gas consisting of substantially pure $CO_2$ and steam,
    wherein an amine-based scrubber plant is employed comprising one or more absorption columns and one or more desorption columns as $CO_2$, capture and separation plant, wherein
    the absorbent is monoethanolamine,
    absorption and desorption processes are conducted at around, ambient pressure, which is approximately 1 bar, and
    the absorbent has a temperature between 20 and 60° C., during the absorption process and between 120 and 160° C., during the desorption process.

2. A method according to claim 1, wherein operation of the secondary $CO_2$-generating process is adapted in such a manner that the exhaust gas is given a pressure and temperature that cause all of the steam to be condensed during the heat exchanging with the at least one enriched absorbent, in order thereby to achieve approximately 100% separation of water and the $CO_2$ gas phase in the exhaust gas.

3. A method according to claim 2, wherein the secondary process is a combustion of a substantially pure hydrocarbon in pure oxygen atmosphere while injecting controlled amounts of water in order to form an exhaust gas substantially consisting of about 90% steam and 10% $CO_2$ at a pressure of about 80 bar and a temperature of about 600° C. for use in a steam turbine generator for production of electrical energy before the exhaust gas is passed to be heat-exchanged with the at least one enriched absorbent.

4. A method according to claim 1, wherein the primary $CO_2$-generating process is a thermal power plant fired by carbonaceous fuel, a cement factory, or an ammonia production plant.

5. A method according to claim 4, wherein the thermal power plant is a "natural gas combined cycle" plant.

6. A method according to claim 1, wherein the absorbent has a temperature around 40° C. during the absorption process, and around 120 to 140° C. during the desorption process.

* * * * *